US010860757B1

(12) United States Patent
Li et al.

(10) Patent No.: US 10,860,757 B1
(45) Date of Patent: Dec. 8, 2020

(54) MULTICORNER SKEW SCHEDULING CIRCUIT DESIGN

(71) Applicant: Cadence Design Systems, Inc., San Jose, CA (US)

(72) Inventors: Zhuo Li, Austin, TX (US); Michael Alexander, Graham, WA (US)

(73) Assignee: Cadence Design Systems, Inc., San Jose, CA (US)

( * ) Notice: Subject to any disclaimer, the term of this patent is extended or adjusted under 35 U.S.C. 154(b) by 87 days.

(21) Appl. No.: 16/232,794

(22) Filed: Dec. 26, 2018

(51) Int. Cl.
*G06F 30/30* (2020.01)
*G06F 119/12* (2020.01)

(52) U.S. Cl.
CPC .......... *G06F 30/30* (2020.01); *G06F 2119/12* (2020.01)

(58) Field of Classification Search
CPC .................................................. G06F 30/3312
See application file for complete search history.

*Primary Examiner* — Jack Chiang
*Assistant Examiner* — Aric Lin
(74) *Attorney, Agent, or Firm* — Schwegman Lundberg & Woessner, P.A.

(57) ABSTRACT

Electronic design automation systems, methods, and media are presented for slack scheduling. Some embodiments analyzing slack values at the input and output of a circuit element across multiple views. A skew value is then selected which maximizes the slack at the input and output of the circuit element across all views. In some embodiments, this selection operation is streamlined by first identifying skew ranges that preserve a local worst negative slack, and the selected skew value to maximize the slacks is chosen from the identified skew ranges, in order to limit the computational resources in identifying the skew which maximizes the minimum slack value. An updated circuit design and associated circuitry may then be generated.

20 Claims, 8 Drawing Sheets

MULTICORNER SKEW SCHEDULING CIRCUIT DESIGN

TECHNICAL FIELD

Embodiments described herein relate to electronic design automation (EDA), and to systems, methods, devices, and instructions for performing timing analysis and associated skew scheduling as part of generation of circuit designs.

BACKGROUND

Electronic design automation (EDA) is a category of systems for assisting with the design of electronic systems and devices. Large, integrated circuit designs are often assembled by selecting from various circuit elements and previously designed blocks. Automated design of routing connections between individual circuit elements or design blocks are also part of such EDA system operations. This enables reduced turnaround times for generation of an integrated circuit. Schematic and layout information for such block portions of a design may be exchanged or licensed as intellectual property. Timing analysis is an EDA verification analysis whereby the timing of circuit elements and/or circuit blocks is analyzed to verify that the design meets constraints in order to operate at intended clock rates in an expected operating environment

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
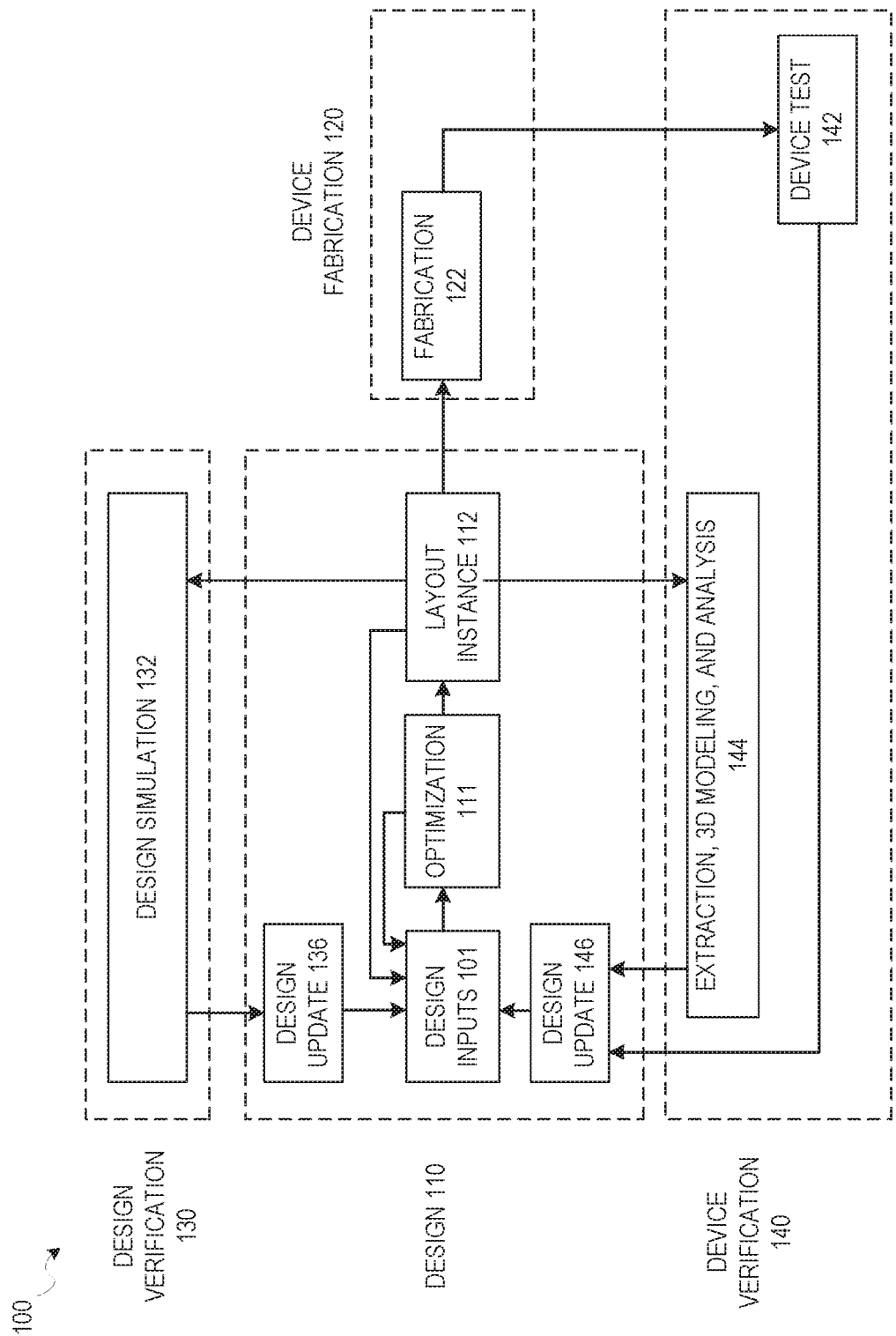
FIG. 1 is a diagram illustrating one possible design process flow for generating a circuit including embodiments to meet timing constraints according to some embodiments.

Embodiments described herein relate to EDA and to methods, computer media, and devices used for analyzing, optimizing, and creating electronic circuits. While certain example embodiments are discussed, it will be apparent that other embodiments not specifically described herein, including embodiments using hierarchical timing analysis performed at any stage of a circuit design, are possible in accordance with the various embodiments presented herein.

To ensure that a circuit design works as planned, a design team uses timing analysis to determine if the various clocks and signals within a circuit design are correctly implemented. Incorrect implementation of timing may prevent a circuit from functioning. One aspect of such timing analysis is skew scheduling for a circuit design. In some systems, multiple operating modes and operating conditions are considered as part of a multi-mode multi-corner (MMMC) analysis for generating timing constraints and analyzing design operation are used. These combinations of a selected mode and a selected "corner" operation condition may also be referred to as "views". A view is thus a combination of a corner and a mode. For designs with multiple views, there one view may be used as a reference point. For example, in some embodiments of clock tree construction, one view (e.g. a view selected from a combination of timing corners and setup/hold modes) is used to build the initial skeleton of the tree, and modifications to this initial skeleton then considers all additional views polishing steps. As described herein, this may be considered a primary view which is used to scale skews of other views as described below. In other embodiments, any view of the design or another view constructed or selected by a designer may be used as the view for scaling skews.

Due to the complexity of modern circuit design, which involves large numbers of elements designed to operate in varying conditions (e.g. views or corners), previous skew scheduling solutions typically simplify a multi-corner problem into a single corner problem (e.g. skew scheduling is performed only for a primary view or standard operating condition). Such operations, however, have drawbacks. In particular, in some circumstances, improving the slack via skew scheduling at the primary view (e.g. a view set in the circuit design as a standard operating condition) may worsen performance in other views. Embodiments described herein involve skew scheduling to improve performance, or at a minimum avoid degrading performance, across all views. While this may result in degraded performance at the primary view, improvements are provided in non-primary views, resulting in improved design performance across the range of all targeted operating conditions. Additionally, improvements to computing device performance is provided during such operations to optimize a design across all views, as detailed below.

This includes possible design process flows for timing and signal integrity analysis to generate a circuit design and an associated circuit, in accordance with various example embodiments, and operations for automatically modifying such circuits to generate routing tree structures that comply with constraints on skew, wire length, maximum arrival time, and other such timing considerations. It will be apparent that other design flow operations may function using the timing constraints and optimizations described herein, but design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where initial layouts for a balanced clock tree structure and sinks are generated, before adjustments are made to ensure that timing requirements for each sink are met. The initial strategy, tactics, and context for the device to be created are also generated in the design input operation 101, depending on the particular design algorithm to be used.

In some embodiments, following an initial selection of design values in design input operation 101, a routing tree may be generated, in accordance with various embodiments described, herein during optimization operation 111 or layout instance 112, along with any other automated design processes. As described below, design constraints for a routing tree structure and sinks which receive a signal from the routing tree structure may be initiated with design inputs in design input operation 101, and then may be analyzed using timing analysis according to various embodiments. In accordance with embodiments described herein, such inputs may include a maximum wire length for a routing tree, a maximum arrival time for the sinks connected to the routing time, allowable skew values, weights and/or costs for branch point components in a routing tree, or other such design characteristics. While design flow 100 shows such optimization occurring prior to layout instance 112, updates to a routing tree may be performed at any time to improve expected operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for generating or updating a routing tree structure may therefore involve iterations of design input operation 101, optimization operation 111, and layout instance 112 generation. In other systems, other design processes may be used.

After design inputs are used in design input operation 101 to generate a circuit layout, and any optimization operations 111 are performed, a layout is generated in layout instance 112. The layout describes the physical layout dimensions of the device that match the design inputs. This layout may then be used in a device fabrication operation 122 to generate a device, or additional testing and design updates may be performed using designer inputs or automated updates based on the design simulation 132 operations or extraction, 3D (three-dimensional) modeling, and analysis 144 operations. Once the device is generated, the device can be tested as part of device test 142 operations, and layout modifications generated based on actual device performance. Design updates 136 from design simulation 132, design updates 146 from device test 142 or 3D modeling and analysis 144 operations, or direct design input operation 101 may occur after an initial layout instance 112 is generated. In various embodiments, whenever design inputs are used to update or change an aspect of a circuit design, a timing analysis and optimization operation 111 may be performed. For example, in various embodiments, a user may provide an input to an EDA computing device indicating placement of an instance of a multi-instance block within a first portion of a circuit design. Once a design is ready, another input to the EDA computing device may be used to generate constraints for each instance of the multi-instance block, and a timing analysis may be performed using the constraints. An output to a display of the EDA computing device may show results of the timing analysis, or may show optimizations recommended or automatically performed adjustments to the circuit design based on the timing analysis. Further inputs to the EDA computing device may involve adjustments such as user design inputs, with additional timing analysis and optimization initiated via user operation of the EDA computing device.

Figure 2:
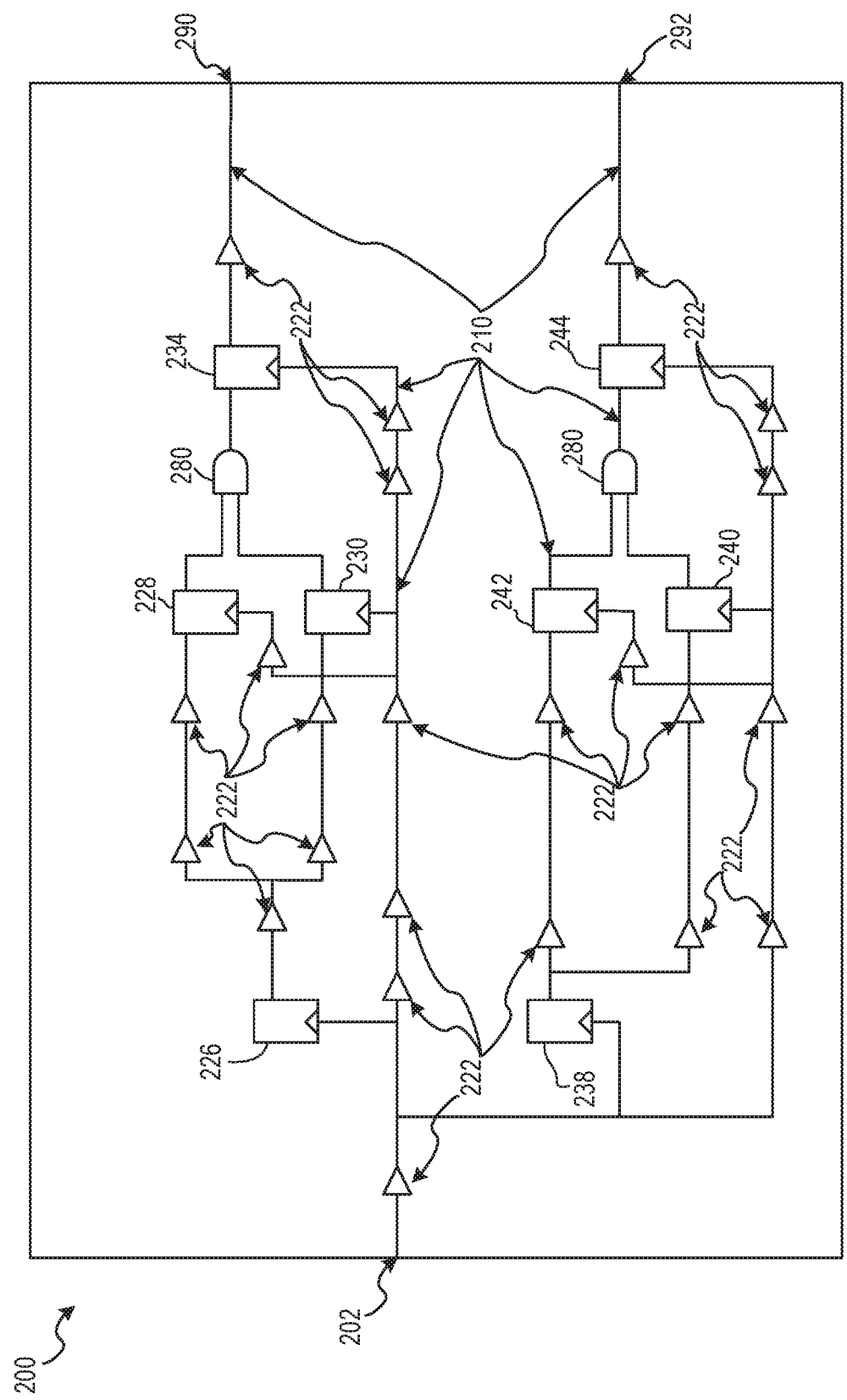
FIG. 2 illustrates aspects of circuit design generation and skew scheduling in accordance with some embodiments.
Figure 3:
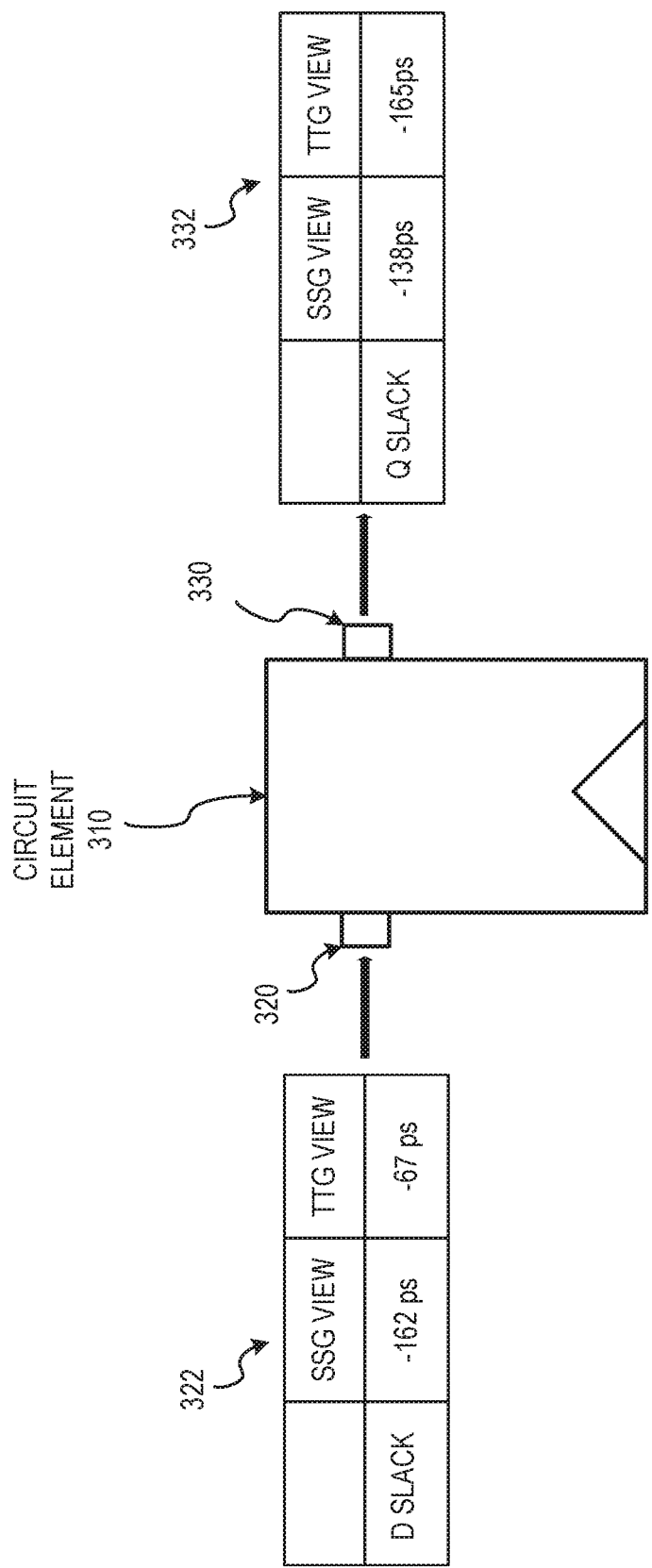
FIG. 3 illustrates aspects of circuit design generation and skew scheduling in accordance with some embodiments.
Figure 4:
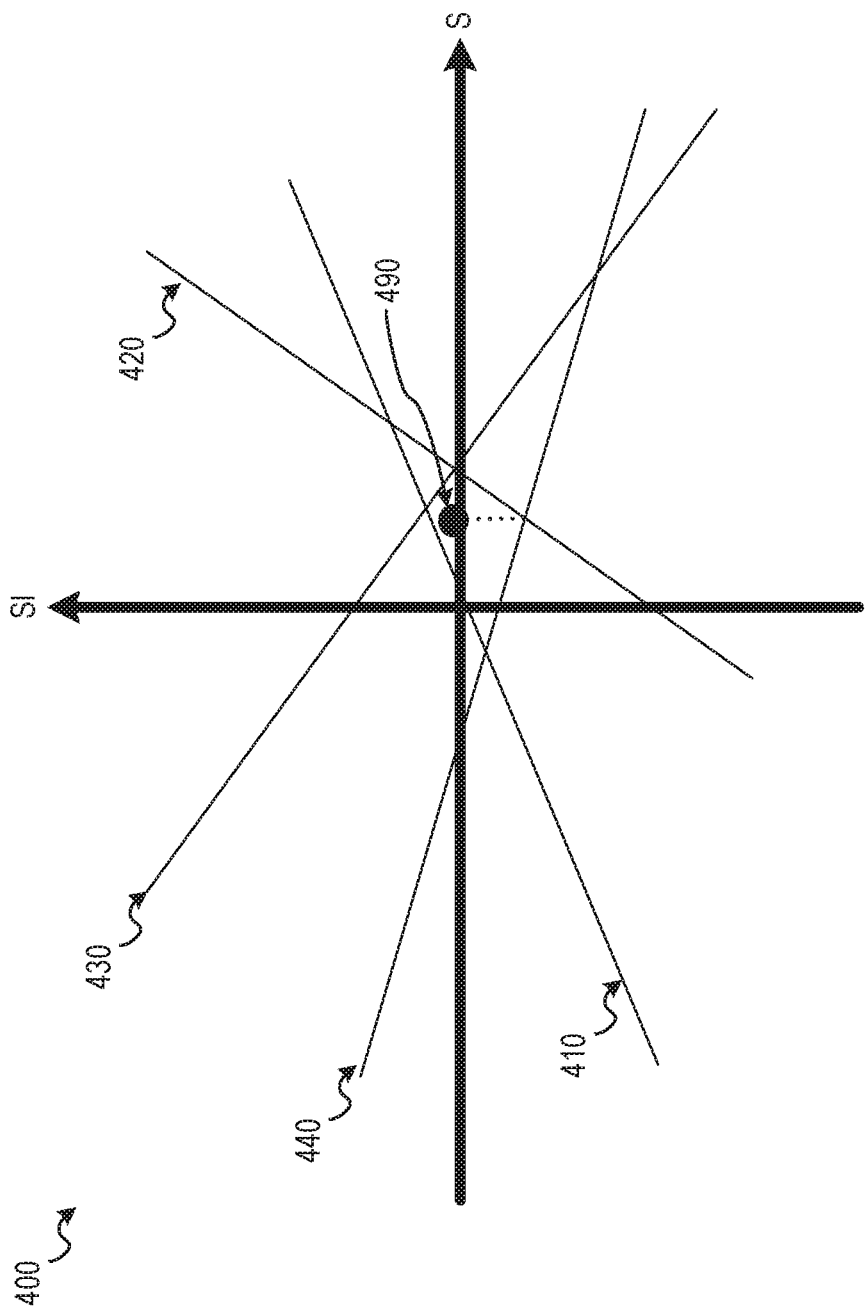
FIG. 4 illustrates a skew scheduling graph illustrating aspects of optimized skew scheduling in accordance with some embodiments.
Figure 5:
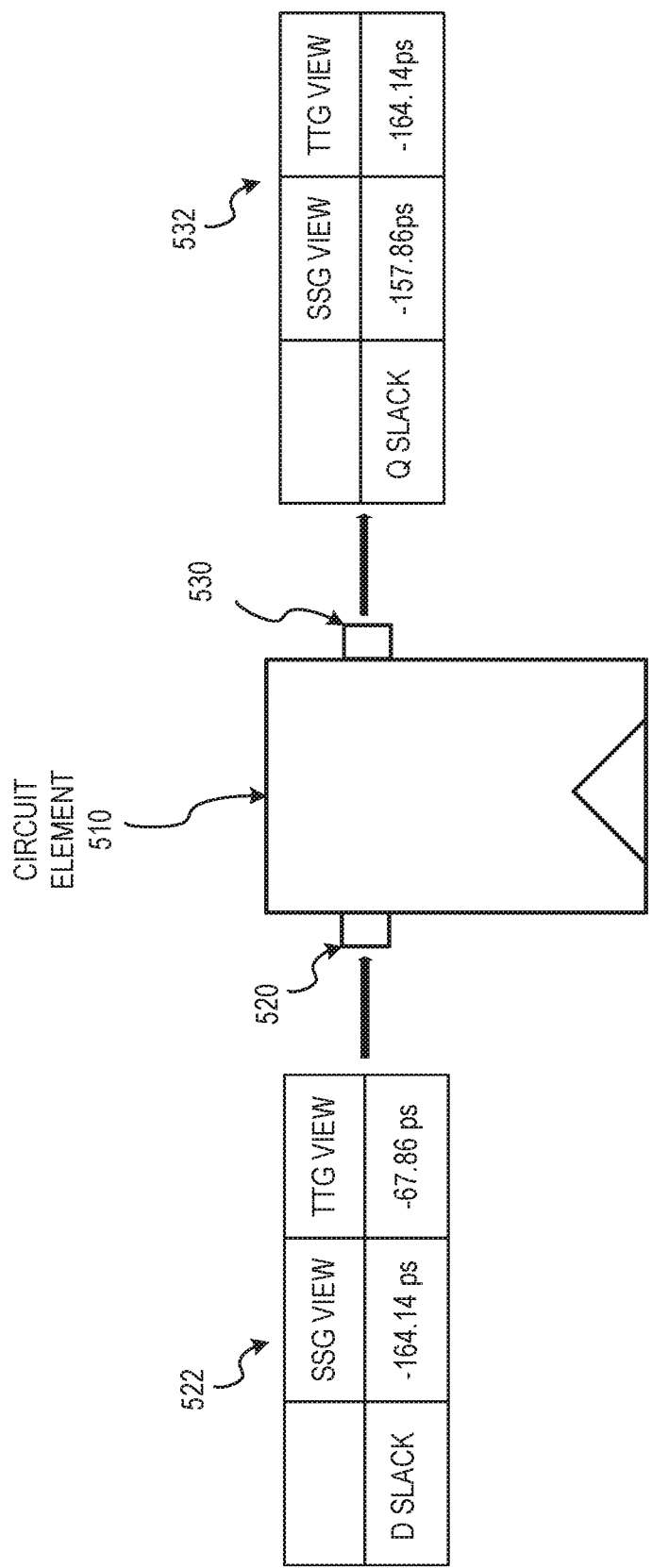
FIG. 5 illustrates aspects of circuit design generation and skew scheduling in accordance with some embodiments.

FIGS. 2, 3, and 5 illustrate aspects of circuit design generation and skew scheduling in accordance with some embodiments. FIG. 2 illustrates an example circuit design 200, in accordance with some embodiments, while FIGS. 3 and 5 illustrate slack values for a circuit element at different views, and FIG. 4 shows a graph of changing slack values for inputs and outputs of a circuit element at different views as a skew across the circuit element is adjusted. In FIG. 2, circuit design 200 includes an input 202, routings 210, buffers 222, multiplexers 280, and state-holding circuit elements 226-244 (e.g. sequential cells or memory elements). In some embodiments, netlist data is accessible by an EDA computing device, with the netlist containing information describing circuit design 200. Additionally, external circuit elements 202 are present in circuit design 200. This includes any elements of the circuit design outside of instances of a multi instance block.

A circuit design such as circuit 200 may be processed by an EDA computing device to generate timing contexts, and these contexts may be analyzed as part of a timing analysis to generate timing reports. In one embodiment, a netlist for circuit design 200 may be loaded with library information, an SPEF, an SDC, and any other such information. This information may be used to identify propagation points within circuit design 200, and particularly within a multi-instance block. The context information is generated from the input information, and includes details related to timing for such propagation points. The timing information for each point is based on an input signal at input 202, the routing 210 to a particular point, and any circuit elements such as buffers 202, multiplexers 280, or state-holding circuit elements such as circuit elements 226-444) which are along the path from clock input 202 to a particular point or output 290,492. In other embodiments, any points within an instance of a block may be selected as propagation points, with all instances derived from the same block having similar corresponding propagation points. In some embodiments, this context information includes boundary conditions at inputs such as constraints for data arrival times, clock arrival times, phase tags representing upstream path constraints, driver information, external parasitics and external timing window aggressors, are generated. Similarly at outputs of circuit elements, for such embodiments, data required times, phase tags representing downstream path constraints, external parasitics and external timing window aggressors are generated as part of timing contexts. Once the timing context is generated, including context information for all views as described above, this information is used to propagate a timing "phase" through each instance of the block.

For various designs, certain signals are intended to arrive at certain points at certain times. Slack is the difference between the expected arrival time of a signal at a certain point, and the actual (e.g. modeled or calculated) arrival time of a signal at the point. For example, a design may target a signal from input 202 to arrive at output 290 after 1000 picoseconds (ps) and output 292 at 1000 ps. Due to differences in routings 210, buffers 222, and other circuit elements along the different paths between the input 202 and the different outputs 290, 292, the signal may actually arrive at output 290 after 950 ps and at output 292 after 1100 ps. Relatedly, skew is the timing difference between signals (e.g. clock skew is the instantaneous difference between the readings of any two clocks). The slack and skew values for various portions of a circuit design may be adjusted by changing the routing lines or by inserting buffers, inverters, or other circuit elements along the routes.

Additionally, the slack value at any point in a circuit design may differ for the same point under different operating conditions, as illustrated by FIG. 3. The example of FIG. 3 uses two different views, referred to as SSG view and TTG view. FIG. 3 shows a circuit element 310 with an input 320 and an output 330. Slack values 322 are associated with input 320 of circuit element 310. Slack values 322 are associated with output 330 of circuit element 310. The slack at input 320 (e.g. D slack) for the SSG view is shown as −162 ps, and for the TTG view is shown as −67 ps. The slack at output 330 (e.g. Q slack) for the SSG view is shown as −158 ps and for the TTG view is shown as −165 ps. Information for a 3$^{rd}$ view (e.g. a primary view) is not shown, but the SSG view and the TTG view are related to primary view by a scaling factor. The scaling factor may either be provided in the circuit design, or may be calculated from various design inputs. In some embodiments, the scale factors are characterization of how physical delay scales between views, at a particular point in the design. Some embodiments use physical clock delay measured near to the point where skewing occurs in order to determine how a skew, once implemented, is likely to scale between views in order to determine scaling factors. In the example of FIG. 3, the scaling factor for the SSG view is given as to, and the scaling factor for the TTG view is given as 0.8. In other words, the scaling factor for a given view i of the set of views 1 through K under consideration may be given as:

$$b_i = Slp/Sli \quad (1)$$

where Slp is the slack for a given point for the primary view, Sli is the slack for the given point for view i of the K views under consideration, and $b_i$ is the scaling factor for view i.

In order to provide improved performance of a circuit design across all views, embodiments described herein use the above information to select a skew across a circuit element (e.g. between the input and the output) which results in a maximize value for the minimum slack value at the input and output across all views. As the skew value at the primary view changes, the slack values at the input and output changes in various ways associated with the scaling factor for each view.

Graph 400 of FIG. 4 illustrates this with slack lines 410, 420, 430, and 440. These lines chart the slack (e.g. the y-axis showing slack values Sl) for a circuit element at different views against the variable skew selected across the input and output of the circuit element (e.g. the x-axis showing skew values S). Each of the slack lines 410, 420, 430, and 440 are associated with either an input or an output of the circuit element, and each line is also associated with a particular view. A slack value for the input at view I is given by $$D = D_i + s*b_i \quad (2)$$

where D is the calculated slack value at the circuit element input, $D_i$ is the offset slack value at the circuit element input based on the routing, s is the skew value which the system is attempting to set to maximize the minimum of all slack values across views, and $b_i$ is the scaling factor for the circuit element at view i. In some embodiments, scheduled skew value may be set according to the value of skew s which provides a maximum value of:

$$\text{Min}(Q_1 - s*b_1, \ldots, Q_k - s*b_k, D_1 + s*b_1, \ldots, D_{k+s}*b_k)). \quad (3)$$

where Q and D are input and output offset slack values for each view, and b is the scaling value described above. A slack value for the output at view i is given by:

$$Q = Q_i - s*b_i \quad (4)$$

where Q is the calculated slack value at the circuit element input, $Q_i$ is the offset slack value at the circuit element output based on the routing and other design elements, s is the skew value which the system is attempting to set to maximize the minimum of all skew values across views, and $b_i$ is the scaling factor for the circuit element at view I, which is the same as in the other equations above.

Looking at the chart 400 of FIG. 4, slack lines for two views of a circuit element are provided, with each view having an input slack line and an output slack line, for a total of four slack lines. On the left side of the chart where slack s is lower, the lowest slack is associated with slack line 420. As the skew value increases, the lowest slack value (e.g. the slack from slack line 420) increases until the skew reaches skew value 490. At this point, the slack value associated with slack line 400 is equal to the slack value from slack line 420. As the skew value increases, the slack value associated with slack line 440 decreases, and the maximum slack value for the input and output at all views decreases. Selecting the skew value associated with point 490 thus provides the maximum slack value for the minimum of the input and output slacks across all views. Where previous systems may provide skew scheduling selections with better performance slack values at certain views, they may also provide decreased performance at other views. Embodiments described herein provided improved performance of EDA computing devices by identifying such errors which were present in previous EDA computing devices. Such embodiments additionally provide improved performance by achieving improved design result performance across all views compared to previous systems.

For large numbers of views, linear graph searching to identify the appropriate skew value is computationally intensive. In order to further provide improved computing performance, some embodiments may limit the possible skew ranges as follows. When a circuit element is identified and the input and output slack values for each view are identified, the system may compute a range of skew values that preserves the initial worst negative slack (WNS). This may be identified in some embodiments as:

$$\text{range}[\max((M-D_1)/b_1, \ldots, (M-D_k)/b_k)), \min((Q_1 - M)/b_1, \ldots, (Q_k - M)/b_k)] \quad (5)$$

where M is given by:

$$M = \min(Q_1, \ldots, Q_k, D_1, \ldots, D_k). \quad (6)$$

S is a skew value at the primary view, and Q and D are the output and input slack values for given views.

For example, in the embodiment of FIG. 3, the WNS is the slack at output 530, which is −165 ps from the TTG view of slack views 532. For the SSG view, the range of potential skews which preserves this WNS is [−3 ps, +7 ps]. For the TTG view, the skew range which preserves this WNS is [−98, 0]. Changing the skew value for each view by more than the skew range amounts would result in a slack value lower than −165 ps. The range of possible skew values selected as part of the skew scheduling may thus be limited to these ranges, and because determination of these ranges is more computationally efficient than searching across all skew values for the skew value which provides the maximum value of the minimum slack value at all views for the inputs and outputs (e.g. point 490 of FIG. 4), determining these ranges further improves the performance of a computing device performing the skew scheduling as described herein. Once these safe skew ranges are determined, a set of corresponding scaled skew values are created using pairings of views. This is done by identifying a skew for each input slack value at each view paired with each output slack value at each view. For the embodiment of FIG. 3 with two views, such that there are two input slack values and two output slack values, four skew values result. In some embodiments, the set of corresponding scaled skews are determined according to:

$$Sij=(Q_i-D_j)/(b_i+b_j) \quad (7)$$

where Sij is a corresponding scaled skew of the set of corresponding scaled skews determined from the D slack at view I equated with the Q slack from view j; k is a number of views; $D_j$ is an input slack at view j of views 1 through k; $Q_i$ is an output slack at view i of views 1 through k; $b_i$ is a scaling value of view I of views 1 through k; and $b_j$ is a scaling value of view j of views 1 through k. S is then a value selected from a set of safe Sij values (e.g. where the set of all Sij is the set of all slacks derived from all combinations of D slacks and Q slacks).

For the embodiment of FIG. 3 with two views, such that there are two input slack values and two output slack values, four skew values result. The TTG view input slack paired with the SSG view output slack, for example, provides (67−158)/(2+0.8)=−32.5 ps. Similarly, the SSG view input slack paired with the SSG view output slack provides a skew value of 1 ps, the SSG view input slack coupled with the TTG view output slack provides a skew value of −1.07 ps, and the input TTG view paired with the output TTG view slack results in a skew of −61 ps. The only one of these values which is within the above provided safe skew ranges is the skew value for the input SSG view slack coupled with the output TTG view slack, which is a skew value of −1.07 ps. This skew value is then selected as an update skew value for the skew scheduling to improve the circuit design. If multiple skew values from the slack pairings across different views where within the acceptable range, then the slack values resulting from each skew would be identified, and the skew value for which the lowest slack value results across all views for both the input and output would be selected.

FIG. 5 then illustrates the selected update skew applied at the different views using the scaling factors to arrive at slack values 522 and 532 for circuit element 310 with input 320 and output 330. For the SSG view, the applied skew based on the scaling factor of 2 for the SSG view which results in slack values of 164.14 ps for the input and −157.86 ps at the output. For the TTG view, the scaling factor of 0.8 results in slack values in an input slack of −67.86 ps and an output slack of −164.14 ps. The WNS is thus improved and optimized across all views. The scheduled skew for the circuit element may then be used to update the circuit design, and for any associated fabrication of a circuit. Similar skew scheduling may be used for circuit elements throughout a circuit design, such as all flip-flop elements of circuit design 200.

Figure 6:
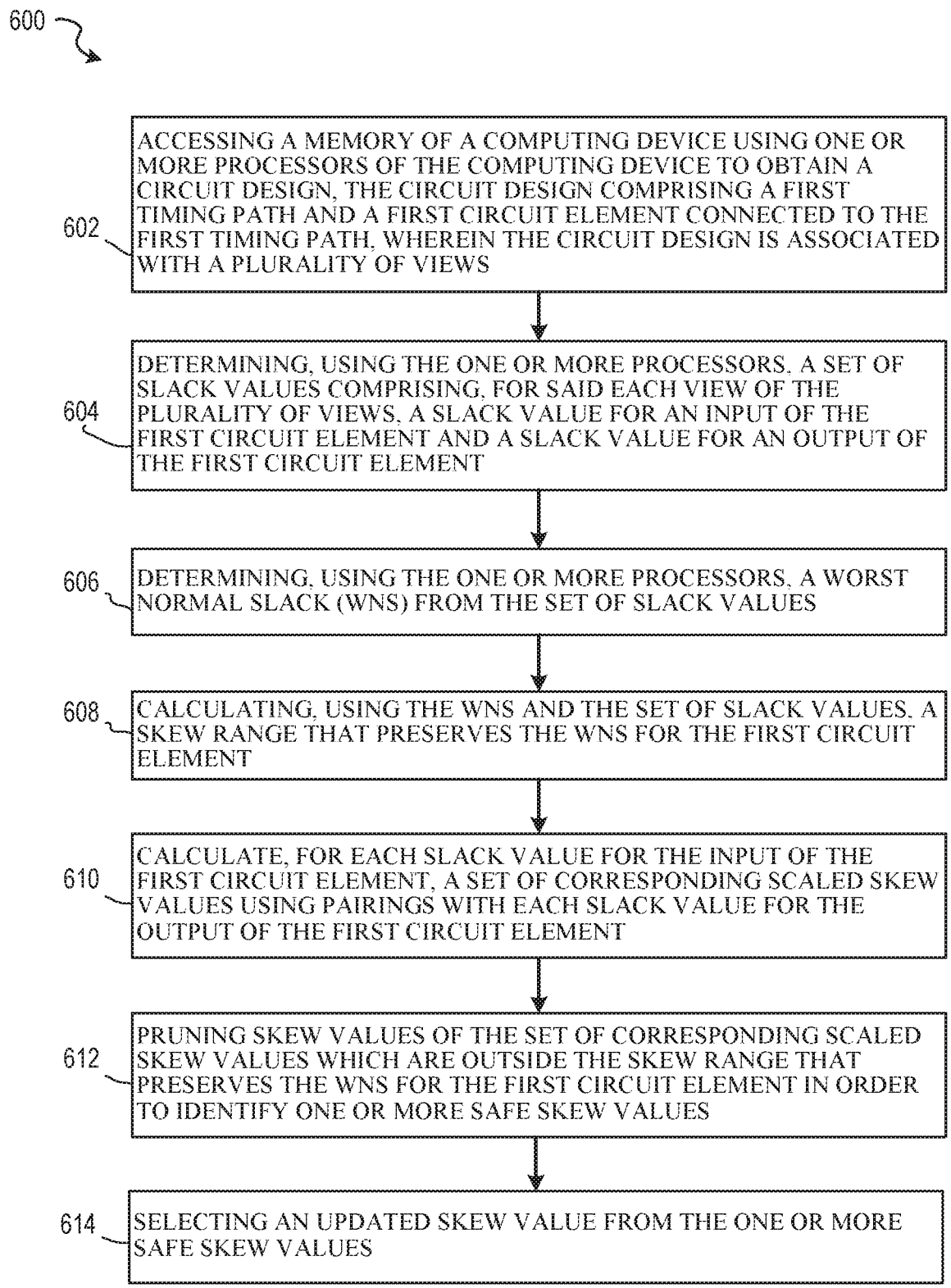
FIG. 6 describes a method for skew scheduling in accordance with some embodiments.

FIG. 6 is an example method 600 of skew scheduling according to some example embodiments. In some embodiments, method 600 is a method performed by an EDA computing device to generate design files for a circuit design. In some embodiments, method 600 is represented by instructions stored in a memory of an EDA computing device or in a non-transitory computer readable medium, where the instructions cause the EDA computing device to perform method 1200 when executed by one or more processors.

Method 600 begins with accessing a first circuit design (e.g. one or more design files) in operation 1202. The circuit design includes a first timing path and a first circuit element connected to the first timing path. The circuit design is also associated with a plurality of views the first circuit design. Further, the first timing path and the first circuit element may have associated skew scheduling values for the different views which are set by the operations below. The circuit design accessed may be represented by various design, library, SDC, and other files. Operation 604 then involves determining, using the one or more processors, a set of slack values comprising, for said each view of the plurality of views, a slack value for an input of the first circuit element and a slack value for an output of the first circuit element. In certain embodiments, this may be performed for all views associated with the circuit design. In other embodiments, an analysis of the views is performed to prune the views considered, such that redundant views are eliminated to simplify and minimize use of computing resources.

A worst negative slack (WNS) from the set of slack values is then identified in operation 606. The WNS is the lowest (e.g. the largest negative number) of slack values for either the input or output of the circuit element across all views being considered. This is assumed to be the lowest slack across all views, as other pruned views would not contain the WNS at this point. Operation 608 then involves calculating, using the WNS and the set of slack values, a skew range that preserves the WNS for the first circuit element. Specific examples of such calculations are described above, and this operation limits the potential skew values that are searched in later operations to improve computer processor operation.

A set of corresponding scaled skew values using pairings with each slack value for the output of the first circuit element and for each slack value for the input of the first circuit element are then calculated in operation 610. For example, if five views are considered, then 25 scaled skew values are calculated, as each input view slack is matched with the output slacks from the five views (e.g. a same view and four different views). Various embodiments may operate to consider slacks and scaled skew values for any such combination of views. S skew values of the set of corresponding scaled skew values which are outside the skew range that preserves the WNS for the first circuit element are pruned (e.g. rejected) in order to identify one or more safe skew values in operation 612. An updated skew value for skew scheduling is then selected from the one or more safe skew values in operation 614.

In some embodiments, the operations then proceed with generating or initiating generation of a set of masks from the updated circuit design for use in generating an integrated circuit comprising the updated circuit design. The component arrangement defined and generated in the above operations may then be used to fabricate (e.g., generate) or initiate generation of an integrated circuit using the component arrangement. In various embodiments, various devices, systems, and methods are used to fabricate devices based on the updated circuit design. In some embodiments, this includes generation of masks and the use of machinery for circuit fabrication. In various implementations, files generated by embodiments described herein are used to create photolithographic masks for lithography operations used to generate circuits according to a circuit design, where a pattern defined by the masks is used in applying a thin uniform layer of viscous liquid (photo-resist) on the wafer surface. The photo-resist is hardened by baking and then selectively removed by projection of light through a reticle containing mask information. In some implementations, the files are further used for etching patterning, where unwanted material from the surface of the wafer is removed according to details described in the design files, where a pattern of the photo-resist is transferred to the wafer by means of etching agents. In some embodiments, aspects of design files generated according to the operations described herein are used for deposition operations, where films of the various materials are applied on the wafer. This may involve physical vapor deposition (PVD), chemical vapor deposition (CVD) or any such similar processes. Some embodiments may use files generated according to operations described herein for chemical mechanical polishing, where a chemical slurry with etchant agents is used to planarize to the wafer surface, for oxidation where dry oxidation or wet oxidation molecules convert silicon layers on top of the wafer to silicon dioxide, for ion implantation where dopant impurities are introduced into a semiconductor using a patterned electrical field, or for diffusion where bombardment-induced lattice defects are annealed. Thus, in various embodiments, systems and operations include not only computing devices for generating updated circuit design files, but also hardware systems for fabricating masks, controlling IC fabrication hardware, and the hardware and operations for fabricating a circuit from a circuit design (e.g., component arrangement) generated in accordance with various embodiments described herein.

Additionally, it will be apparent that any apparatus or operations described herein in accordance with various embodiments may be structured with intervening, repeated, or other elements while still remaining within the scope of the contemplated embodiments. Some embodiments may include multiple receivers, along with any other circuit elements. Some embodiments may function with described operating modes as well as other operating modes. The various embodiments described herein are thus presented as examples, and do not exhaustively describe every possible implementation in accordance with the possible embodiments.

Figure 7:
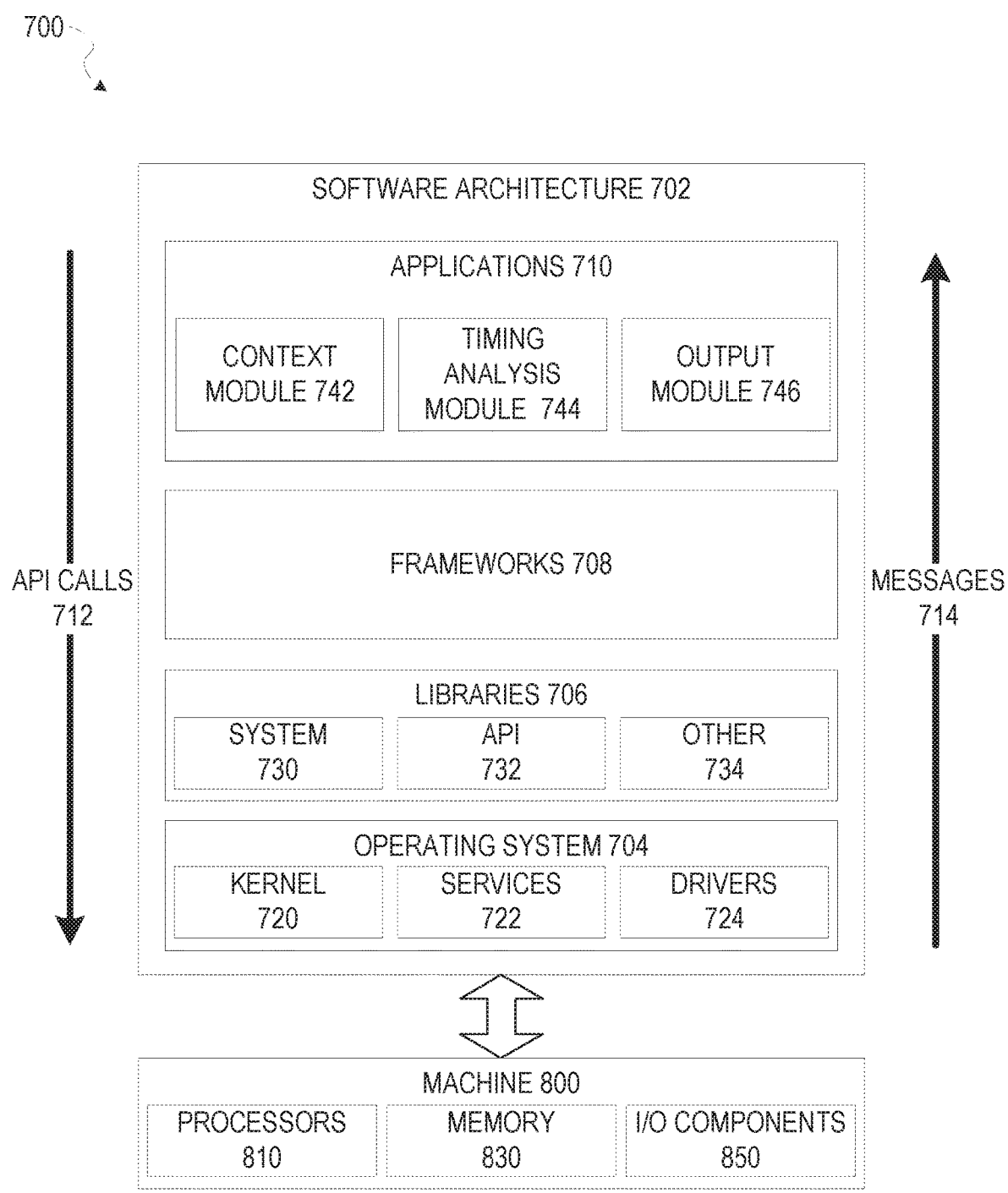
FIG. 7 is a block diagram illustrating an example of a software architecture that may be operating on an electronic design automation (EDA) computer and used with methods for skew scheduling according to some example embodiments.

FIG. 7 is a block diagram 700 illustrating an example of a software architecture 702 that may be operating on an EDA computer and used with methods for modifying a balanced clock structure, according to some example embodiments. Software architecture 702 can be used as an electronic design automation computing device to implement any of the methods described above. Aspects of software architecture 702 may, in various embodiments, be used to store circuit designs and execute timing analysis or optimization in an EDA environment to generate circuit designs, with physical devices generated using these circuit designs.

FIG. 7 non-limiting example of a software architecture 702, and it will be appreciated that many other architectures can be implemented to facilitate the functionality described herein. In various embodiments, the software architecture 702 is implemented by hardware such as machine 800 that includes processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments. In various embodiments, any client device, server computer of a server system, or any other device described herein may operate using elements of software architecture 702. An EDA computing device described herein may additionally be implemented using aspects of the software architecture 702, with the architecture 702 adapted for operating to perform clock synthesis and modification of balanced clock structures in accordance with embodiments herein.

In one embodiment, an EDA application of applications 710 performs routing tree generation and/or adjustments, according to embodiments described herein, using various modules within software architecture 702. For example, in one embodiment, an EDA computing device similar to machine 800 includes memory 830 and one or more processors 810. The processors 810 implement a view pruning module 742 to improve routing tree synthesis in some embodiments. The processors 810 also implement additional EDA module(s) 744 to implement various circuit design operations including skew scheduling as described herein. The design is finalized by an output module 746 if the criteria/design thresholds are met.

In some embodiments, processor-implemented output module 746 may then be used to update a display of I/O components 850 of the EDA computing device with data associated with the updated routing tree generated by the process.

In various other embodiments, rather than being implemented as modules of one or more applications 710, some or all of modules 742, 744, and 746 may be implemented using elements of libraries 706 or operating system 704.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 such as libraries of multi-instance blocks for use in an EDA environment or other libraries that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 706 may also include other libraries 734.

The software frameworks 708 provide a high-level common infrastructure that can be utilized by the applications 710, according to some embodiments. For example, the software frameworks 708 provide various graphic user interface (GUI) functions, high-level resource management, high-level location services, and so forth. The software frameworks 708 can provide a broad spectrum of other APIs that can be utilized by the applications 710, some of which may be specific to a particular operating system 704 or platform. In various embodiments, the systems, methods, devices, and instructions described herein may use various files, macros, libraries, and other elements of an EDA design environment to implement analysis described herein. This includes analysis of input design files for an integrated circuit design, along with any element of view pruning, testing, and design updating that may be used as part of or along with the embodiments described herein. While netlist files, library files, SDC files and view definition files are examples that may operate within a software architecture 702, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 800 including processors 810), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 800, but deployed across a number of machines 800. In some example embodiments, the processors 810 or processor-implemented modules are located in a single geographic location (e.g., within a home environment, an office environment, or a server farm). In other example embodiments, the processors 810 or processor-implemented modules are distributed across a number of geographic locations.

Figure 8:
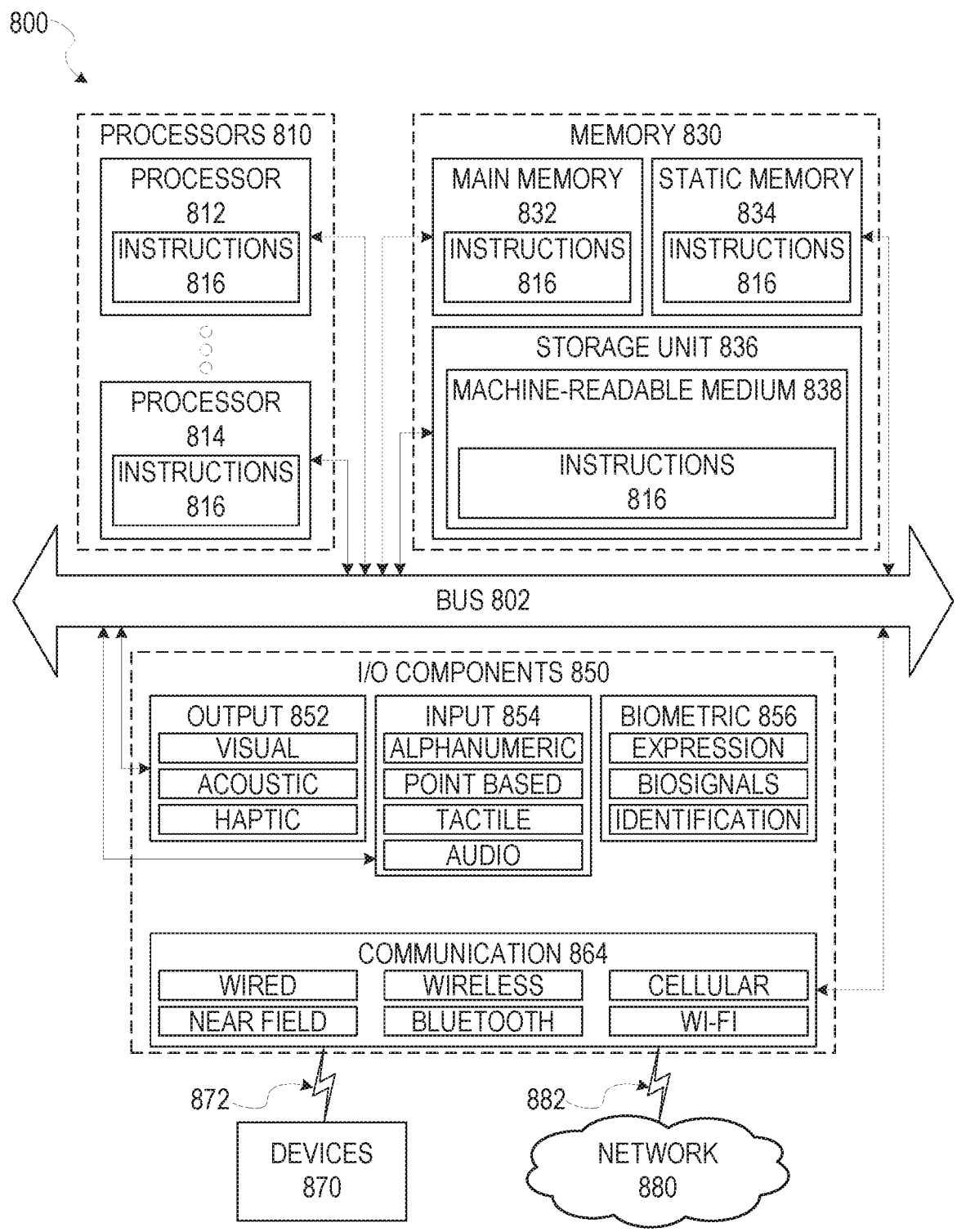
FIG. 8 is a diagrammatic representation of a machine in the form of a computer system within which a set of instructions may be executed for causing the machine to perform any one or more of the methodologies discussed herein, according to an example embodiment.

FIG. 8 is a diagrammatic representation of the machine 800 in the form of a computer system within which a set of instructions may be executed for causing the machine 800 to perform any one or more of the methodologies discussed herein, according to an example embodiment. FIG. 8 shows components of the machine 800, which is, according to some embodiments, able to read instructions from a machine-readable medium (e.g., a machine-readable storage medium) and perform any one or more of the methodologies discussed herein. In some embodiments, the machine 800 may operate with instructions 816 (e.g., software, a program, an application, an applet, an app, or other executable code) for causing the machine 800 to perform any one or more of the methodologies discussed. In alternative embodiments, the machine 800 operates as a standalone device or can be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute instructions 816 contemporaneously. Although FIG. 8 shows multiple processors 810, the machine 800 may include a single processor 812 with a single core, a single processor 812 with multiple cores (e.g., a multi-core processor 812), multiple processors 810 with a single core, multiple processors 810 with multiples cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine or any of a wide variety of peripheral devices (e.g., a peripheral device coupled via a USB).

Transmission Medium

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

Furthermore, the machine-readable medium 838 is non-transitory (in other words, not having any transitory signals) in that it does not embody a propagating signal. However, labeling the machine-readable medium 838 "non-transitory" should not be construed to mean that the medium 838 is incapable of movement, the medium 838 should be considered as being transportable from one physical location to another. Additionally, since the machine-readable medium 838 is tangible, the medium 838 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
   accessing a memory of a computing device using one or more processors of the computing device to obtain a circuit design, the circuit design comprising a first timing path and a first circuit element connected to the first timing path, wherein the circuit design is associated with a plurality of views;
   determining, using the one or more processors, a set of slack values comprising, for each view of the plurality of views, an input slack value for an input of the first circuit element and an output slack value for an output of the first circuit element;

determining, using the one or more processors, a worst negative slack (WNS) from the set of slack values;

calculating, using the WNS and the set of slack values, a skew range that preserves the WNS for the first circuit element;

calculating a set of scaling factor values by calculating, for each individual view of the plurality of views, a physical clock delay measured near a point where skewing occurs to estimate how skew is expected to scale between the individual view and a primary view of the plurality of views;

generating, for each individual input slack value for the input of the first circuit element, a set of corresponding scaled skew values using at least one scaling factor value from the set of scaling factor values, the generating the set of corresponding scaled skew values comprising, for each combination of the individual input slack value and an individual output slack value in the set of slack values:

dividing a difference, between the individual input slack value and the individual output slack value of the combination, by a sum of corresponding scaling factor values from the set of scaling factor values, the corresponding scaling factor values corresponding to the individual input slack value and the individual output slack value;

pruning skew values of the set of corresponding scaled skew values which are outside the skew range that preserves the WNS for the first circuit element in order to identify one or more safe skew values;

selecting an updated skew value from the one or more safe skew values; and generating an updated circuit design using the circuit design and the updated skew value.

2. The method of claim 1, wherein selecting the updated skew value from the one or more safe skew values comprises selecting a single skew value of the one or more safe skew values that maximizes an associated slack at the input of the first circuit element and the output of the first circuit element for all views of the plurality of views.

3. The method of claim 1, wherein the set of scaling factor values describes a timing speed for an associated view of the plurality of views compared with the primary view of the plurality of views.

4. The method of claim 1, wherein the set of corresponding scaled skew values is generated according to:

$$Sij=(Q_i-D_j)/(b_i+b_j),$$

where Sij is a corresponding scaled skew value of the set of corresponding scaled skew values;
k is a number of views;
$D_j$ is an input slack value at view j of views 1 through k;
$Q_i$ is an output slack value at view i of views 1 through k;
$b_i$ is a scaling factor value of view i of views 1 through k; and
$b_j$ is a scaling factor value of view j of views 1 through k.

5. The method of claim 4, further comprising determining the skew range that preserves the WNS according to:

$$S \text{ range}[\max((M-D_1)/b_1,\ldots,(M-D_k)/b_k)),\min((Q_1-M)/b_1,\ldots,(Q_k-M)/b_k)],$$

where S is a skew value at the primary view; and
$M=\min(Q_1,\ldots,Q_k,D_1,\ldots,D_k)$.

6. The method of claim 1, wherein the updated skew value is selected to maximize a lowest slack value of a set of updated slacks, the set of updated slacks comprising updated input slack values at the input of the circuit element for each view and updated output slack values at the output of the first circuit element for each view.

7. The method of claim 1, further comprising generating a set of masks from the updated circuit design for use in generating an integrated circuit that comprises the updated circuit design.

8. A device comprising:
a memory configured to store a circuit design, the circuit design comprising a first timing path and a first circuit element connected to the first timing path, wherein the circuit design is associated with a plurality of views;
one or more processors coupled to the memory and configured to perform operations for generating an updated circuit design, the operations comprising:
identifying a primary view from the plurality of views;
calculating a scaling factor value for each view of the plurality of views;
determining a set of slack values comprising, for each view of the plurality of views, an input slack value for an input of the first circuit element and an output slack value for an output of the first circuit element;
determining, using the one or more processors, a worst negative slack (WNS) from the set of slack values;
calculating, using the WNS and the set of slack values, a skew range that preserves the WNS for the first circuit element;
calculating a set of scaling factor values by calculating, for each individual view of the plurality of views, a physical clock delay measured near a point where skewing occurs to estimate how skew is expected to scale between the individual view and a primary view of the plurality of views;
generating, for each individual input slack value for the input of the first circuit element, a set of corresponding scaled skew values using at least one scaling factor value from the set of scaling factor values, the generating the set of corresponding scaled skew values comprising, for each combination of the individual input slack value and an individual output slack value in the set of slack values:
dividing a difference, between the individual input slack value and the individual output slack value of the combination, by a sum of corresponding scaling factor values from the set of scaling factor values, the corresponding scaling factor values corresponding to the individual input slack value and the individual output slack value;
pruning skew values of the set of corresponding scaled skew values which are outside the skew range that preserves the WNS for the first circuit element in order to identify one or more safe skew values;
selecting an updated skew value from the one or more safe skew values; and
generating an updated circuit design using the circuit design and the updated skew value.

9. The device of claim 8, wherein the set of corresponding scaled skew values is generated according to:

$$Sij=(Q_i-D_j)/(b_i+b_j),$$

where Sij is a corresponding scaled skew value of the set of corresponding scaled skew values;
k is a number of views;
$D_j$ is an input slack value at view j of views 1 through k;
$Q_i$ is an output slack value at view i of views 1 through k;

$b_i$ is a scaling factor value of view i of views 1 through k; and $b_j$ is a scaling factor value of view j of views 1 through k.

10. The device of claim 9, further comprising determining the skew range that preserves the WNS according to:

$$S\ \text{range}[\max((M-D_1)/b_1,\ldots,(M-D_k)/b_k)),\min((Q_1-M)/b_1,\ldots,(Q_k-M)/b_k)],$$

where S is a skew value at the primary view; and
$M=\min(Q_1,\ldots,Q_k,D_1,\ldots,D_k)$.

11. The device of claim 8, wherein the updated skew value is selected to maximize a lowest slack value of a set of updated slacks, the set of updated slacks comprising updated input slack values at the input of the circuit element for each view and updated output slack values at the output of the first circuit element for each view.

12. The device of claim 8, wherein selecting the updated skew value from the one or more safe skew values comprises selecting a single skew value of the one or more safe skew values that maximizes an associated slack at the input of the first circuit element and the output of the first circuit element for all views of the plurality of views.

13. The device of claim 8, wherein the set of scaling factor values describes a timing speed for an associated view of the plurality of views compared with the primary view of the plurality of views.

14. The device of claim 8, wherein the updated skew value is selected to maximize a lowest slack value of a set of updated slacks, the set of updated slacks comprising updated input slack values at the input of the circuit element for each view and updated output slack values at the output of the first circuit element for each view.

15. The device of claim 8, wherein the operations further comprise:

generating a set of masks from the updated circuit design for use in generating an integrated circuit that comprises the updated circuit design.

16. A non-transitory computer readable medium comprising instructions that, when executed by one or more processors of an electronic design automation (EDA) computing device, cause the device to perform a method for multi-corner skew scheduling of a circuit design, the method comprising:

determining a set of slack values for the circuit design, the set of slack values comprising, for each view of a plurality of views, a n input slack value for an input of a first circuit element and an output slack value for an output of a first circuit element;

determining a worst negative slack (WNS) from the set of slack values;

calculating, using the WNS and the set of slack values, a skew range that preserves the WNS for the first circuit element;

calculating a set of scaling factor values by calculating, for each individual view of the plurality of views, a physical clock delay measured near a point where skewing occurs to estimate how skew is expected to scale between the individual view and a primary view of the plurality of views;

generating, for each individual input slack value for the input of the first circuit element, a set of corresponding scaled skew values using at least one scaling factor value from the set of scaling factor values, the generating the set of corresponding scaled skew values comprising, for each combination of the individual input slack value and an individual output slack value in the set of slack values:

dividing a difference, between the individual input slack value and the individual output slack value of the combination, by a sum of corresponding scaling factor values from the set of scaling factor values, the corresponding scaling factor values corresponding to the individual input slack value and the individual output slack value;

pruning skew values of the set of corresponding scaled skew values which are outside the skew range that preserves the WNS for the first circuit element in order to identify one or more safe skew values;

selecting an updated skew value from the one or more safe skew values; and generating an updated circuit design using the circuit design and the updated skew value.

17. The non-transitory computer readable medium of claim 16, wherein the set of corresponding scaled skew values is generated according to:

$$Sij=(Q_i-D_j)/(b_i+b_j),$$

where Sij is a corresponding scaled skew value of the set of corresponding scaled skew values;

k is a number of views;

$D_j$ is an input slack value at view j of views 1 through k;

$Q_i$ is an output slack value at view i of views 1 through k;

$b_i$ is a scaling factor value of view i of views 1 through k; and $b_j$ is a scaling factor value of view j of views 1 through k.

18. The non-transitory computer readable medium of claim 17, wherein the method further comprises determining the skew range that preserves the WNS according to:

$$S\ \text{range}[\max((M-D_1)/b_1,\ldots,(M-D_k)/b_k)),\min((Q_1-M)/b_1,\ldots,(Q_k-M)/b_k)],$$

where S is a skew value at the primary view; and
$M=\min(Q_1,\ldots,Q_k,D_1,\ldots,D_k)$.

19. The non-transitory computer readable medium of claim 16, wherein the method further comprises generating an initial routing tree using the primary view prior to determining the set of slack values, wherein the initial routing tree comprises the first circuit element.

20. The non-transitory computer readable medium of claim 16, wherein the updated skew value is selected to maximize a lowest slack value of a set of updated slacks comprising updated input slack values at the input of the circuit element for each view and updated output slack values the output of the first circuit element for each view.

* * * * *